United States Patent
Kunde et al.

(10) Patent No.: US 10,051,064 B2
(45) Date of Patent: Aug. 14, 2018

(54) METHOD AND SYSTEM FOR RECOMMENDING SERVICES TO REQUESTORS

(71) Applicant: Conduent Business Services, LLC, Dallas, TX (US)

(72) Inventors: Shruti Kunde, Mumbai (IN); Tridib Mukherjee, Bangalore (IN); Varun Sharma, Kolkata (IN); Aditya Hegde, Bangalore (IN)

(73) Assignee: Conduent Business Services, LLC, Dallas, TX (US)

( * ) Notice: Subject to any disclaimer, the term of this patent is extended or adjusted under 35 U.S.C. 154(b) by 125 days.

(21) Appl. No.: 15/189,359

(22) Filed: Jun. 22, 2016

(65) Prior Publication Data
US 2017/0374159 A1    Dec. 28, 2017

(51) Int. Cl.
*H04L 29/08* (2006.01)
*H04L 12/24* (2006.01)

(52) U.S. Cl.
CPC .......... *H04L 67/16* (2013.01); *H04L 41/5003* (2013.01); *H04L 67/10* (2013.01)

(58) Field of Classification Search
CPC ...... H04L 67/16; H04L 67/10; H04L 41/5003
USPC ....................................................... 709/223
See application file for complete search history.

(56) References Cited

U.S. PATENT DOCUMENTS

| 8,478,660 B2 | 7/2013 | Toro Escudero et al. |
| 2009/0119637 A1* | 5/2009 | Ganapathy ............. G06Q 10/06 717/101 |

FOREIGN PATENT DOCUMENTS

| CN | 102609468 A | 1/2012 |
| WO | WO 2013013379 A1 | 1/2013 |

OTHER PUBLICATIONS

Falak Nawaz, Kamran Qadir, H. Farooq Ahmad, "SEMREG-Pro: A Semantic based Registry for Proactive Web Service Discovery using Publish Subscribe Model", Fourth International Conference on Semantics, Knowledge and Grid, IEEE Xplore, 2008.
Aabhas V. Paliwal, Nabil R. Adam, Christof Bornhovd, "Web Service Discovery: Adding Semantics through Service Request Expansion and Latent Semantic Indexing", In International Conference on Services Computing (SCC 2007), IEEEXplore, 2007.
Wenge Rong, Kecheng Liu, "A Survey of Context Aware Web Service Discovery: From User's Perspective",Fifth IEEE International Symposium on Service Oriented System Engineering, 2010.
Jianming Zhou, Tianlei Zhang, Hui Meng, Liping Xiao , Guisheng Chen, Deyi Li, "Web Service Discovery based on Keyword clustering and ontology".

* cited by examiner

*Primary Examiner* — Tu Nguyen
(74) *Attorney, Agent, or Firm* — Jones Robb, PLLC

(57) ABSTRACT

A method and a system for recommending services to a requestor over a communication network. A request comprising one or more keywords and one or more service level agreements (SLAs), is received from a requestor computing device over the communication network, to process one or more tasks. One or more first services from one or more available services are selected based on the request. For a first service from the one or more first services, a first score and a second score is determined. The one or more first services are ranked based on the first score and the second score. A recommendation of the one or more first services is transmitted to the requestor based on the ranking.

20 Claims, 5 Drawing Sheets

METHOD AND SYSTEM FOR RECOMMENDING SERVICES TO REQUESTORS

TECHNICAL FIELD

The presently disclosed embodiments are related, in general, to a shared service platform. More particularly, the presently disclosed embodiments are related to recommendation of services to requestors to process one or more tasks.

BACKGROUND

With ever-increasing advancements in the field of cloud-computing based environment, the demand for shared service based platforms is increasing at a rapid rate. The shared service based platforms may allow one or more service providers to share one or more services and recommend one or more shared services to one or more users, based on one or more received requests.

Typically, the one or more users specify functional and non-functional parameters of the services for selection of one or more services, such as web-services. The shared service platform performs Quality of Service (QoS) based matching based on non-functional parameters. Thereafter, the shared service platforms may check for the matching of one or more non-functional parameters in the one or more selected services, which may further be utilized for the recommendation. Such recommendation may be both necessary and sufficient for web services. However, this approach may not be sufficient for services where the one or more users prefer trading some parameters (functional and/or non-functional) with others.

Further limitations and disadvantages of conventional and traditional approaches will become apparent to one of skilled in the art through a comparison of the described systems with some aspects of the present disclosure, as set forth in the remainder of the present application and with reference to the drawings.

SUMMARY

According to embodiments illustrated herein, there is provided a method for recommending services to a requestor over a communication network. The method includes receiving, by one or more transceivers, a request comprising one or more keywords and one or more SLAs, from a requestor computing device over the communication network, to process one or more tasks. The method further includes selecting, by one or more processors, one or more first services from one or more available services based on the request. The one or more first services are associated with a corresponding first set of parameters and a second set of parameters. The first set of parameters correspond to the one or more keywords and the second set of parameters correspond to the one or more SLAs. Further, for a first service from the one or more first services, the method includes determining, by the one or more processors, a first score based on a first set of new parameter values and a first set of weight values corresponding to the one or more keywords in the received request. The method further includes determining, by the one or more processors, a second score based on a second set of new parameter values and a second set of weight values corresponding to the one or more SLAs in the received request. The method further includes ranking, by the one or more processors, the one or more first services based on the first score and the second score. The method further includes transmitting, by the one or more transceivers, a recommendation of the one or more first services to the requestor based on the ranking.

According to embodiments illustrated herein, there is provided a system for recommending services to a requestor over a communication network. The system include one or more transceivers, configured to receive a request comprising one or more keywords and one or more SLAs, from a requestor computing device over the communication network, to process one or more tasks. The system further include one or more processors, configured to select one or more first services from one or more available services based on the request. The one or more first services are associated with a corresponding first set of parameters and a second set of parameters. The first set of parameters correspond to the one or more keywords and the second set of parameters correspond to the one or more SLAs. Further, for a first service from the one or more first services, the one or more processors are configured to determine a first score based on a first set of new parameter values and a first set of weight values corresponding to the one or more keywords in the received request. The one or more processors are further configured to determine a second score based on a second set of new parameter values and a second set of weight values corresponding to the one or more SLAs in the received request. The one or more processors are further configured to rank the one or more first services based on the first score and the second score. The one or more transceivers are further configured to transmit a recommendation of the one or more first services to the requestor based on the ranking.

According to embodiments illustrated herein, there is provided a non-transitory computer-readable storage medium having stored thereon, a set of computer-executable instructions for causing a computer comprising one or more processors, configured to perform step including receiving a request comprising one or more keywords and one or more SLAs, from a requestor computing device over a communication network, to process one or more tasks. The one or more processors are further configured to perform step comprising selecting one or more first services from one or more available services based on the request. The one or more first services are associated with a corresponding first set of parameters and a second set of parameters. The first set of parameters correspond to the one or more keywords and the second set of parameters correspond to the one or more SLAs. Further, for a first service from the one or more first services, the one or more processors are further configured to perform step including determining a first score based on a first set of new parameter values and a first set of weight values corresponding to the one or more keywords in the received request. The one or more processors are further configured to perform step including determining a second score based on a second set of new parameter values and a second set of weight values corresponding to the one or more SLAs in the received request. The one or more processors are further configured to perform step including determining a third score based on at least the first score and the second score. The one or more processors are further configured to perform step including ranking the one or more first services based on the corresponding third score. The one or more processors are further configured to perform step including transmitting a recommendation of the one or more first services to a requestor based on the ranking.

BRIEF DESCRIPTION OF DRAWINGS

The accompanying drawings illustrate various embodiments of systems, methods, and other aspects of the disclosure. Any person having ordinary skills in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

Figure 1:
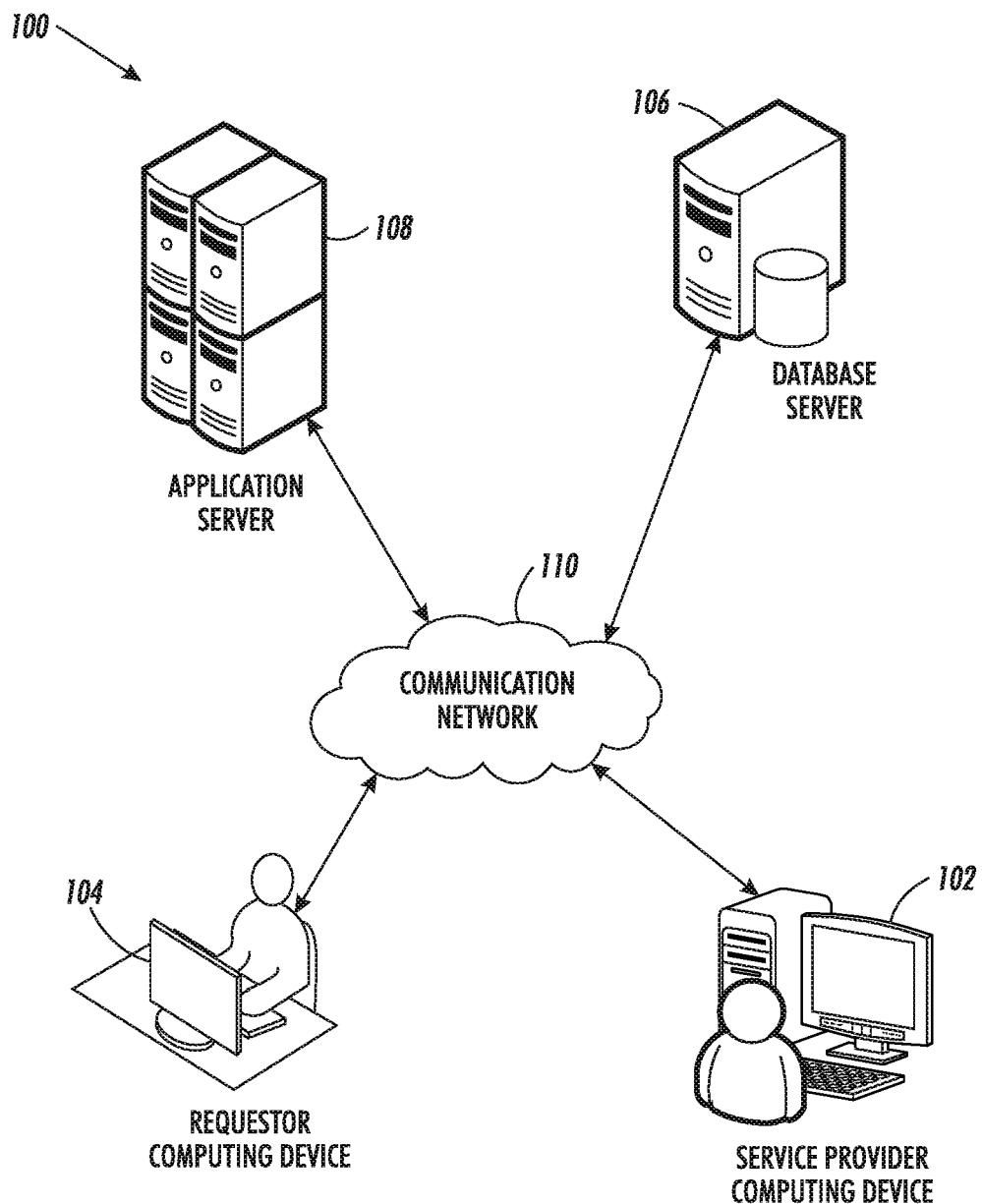
FIG. 1 is a block diagram that illustrates a system environment in which various embodiments of the system may be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions

The following terms shall have, for the purposes of this application, the respective meanings set forth below.

A "computing device" refers to a device that includes one or more processors/microcontrollers and/or any other electronic components, a device, or a system that performs one or more operations according to one or more programming instructions, algorithms, programs, or codes. Examples of the computing device may include, but are not limited to, a desktop computer, a laptop, a Personal Digital Assistant (PDA), a mobile device, a smartphone, a tablet computer (e.g., iPad® and Samsung Galaxy Tab®), and/or the like.

A "shared service platform" refers to a common platform for sharing and/or utilization of one or more services to process one or more tasks. The one or more services may be shared by one or more service providers in exchange of incentives. Further, the one or more services may be utilized by one or more requestors for performing the one or more tasks. The shared service platform may facilitate the one or more requestors to utilize (i.e., buy, rent, or share) the one or more services based on an acceptance of one or more service level agreements (SLAs) associated with the one or more services.

A "service provider" refers to an individual or an entity that may be interested in renting, selling, or sharing one or more services to one or more requestors. In an embodiment, the service provider may rent, sell, or share the one or more services with the one or more requestors through a shared service platform in exchange of incentives (either monetary or non-monetary).

A "requestor" refers to an individual who may require one or more services to perform one or more tasks. In an embodiment, the requestor may transmit a request to a shared service platform or a server to query for an availability of the one or more services that may be required to perform the one or more tasks. The request may include at least one or more keywords that are indicative of the one or more services. The request may further include a preference of the requestor for the one or more keywords. In response to the request, the requestor may receive the one or more services from one or more resource providers through the shared service platform based on at least an agreement over service level agreements (SLAs) associated with the one or more services. Hereinafter, "requestor", "customer", "consumer", "client", or "user" may be used interchangeably.

A "service level agreement (SLA)" refers to an agreement between at least two entities when there is an exchange of at least one service between the at least two entities (e.g., a resource provider, a requestor, and/or a shared service platform). For example, a requestor may enter into an SLA with a shared service platform, based on sharing, renting, or buying of one or more services. In an embodiment, the SLA may include a time period associated with a service, a cost associated with the service, and/or the like.

"One or more available services" refer to one or more intangible commodities that may be provided by one or more service providers. The one or more service providers may share the one or more available services with a platform, such as a shared service platform, to sell, rent, or share the one or more available services with one or more requestors. In an embodiment, each of the one or more available services may be associated with a first set of parameters (i.e., one or more functional parameters) and a second set of parameters (i.e., one or more non-functional parameters). The one or more functional parameters of the one or more available services may be indicative of at least a function or intent of the one or more available services. The one or more functional parameters may include one or more input parameters, one or more output parameters, one or more pre-conditions, and one or more post-conditions. For example, an available service corresponds to a "pdf to word document converter." In such a case, one or more functional parameters of the available service may correspond to "pdf," "word," and "converter." Further, the one or more non-functional parameters of the one or more available services may include one or more parameters that are not directly related to functionality of the one or more available services. For example, the one or more non-functional parameters includes an efficiency, quality, run-time, and service level agreements (SLAs) of the one or more available services. Further, the one or more available services may be associated with one or more domains such as, but are not limited to, an analytics domain, a mobile domain, a distributed domain, a software domain, and/or the like. For example, one or more available services associated with an analytics domain may correspond to one or more of, but are not limited to, a PDF converter, a word converter, and a string tokenizer.

"One or more first services" refer to one or more intangible commodities that may be required by an individual to process a task. The one or more first services may be associated with one or more domains such as, but not limited to, an analytics domain, a mobile domain, a distributed domain, a software domain, and/or the like. For example, one or more first services associated with an analytics domain may correspond to one or more of, but are not limited to, a PDF converter, a word converter, and a string tokenizer. In an embodiment, each of the one or more first services may be associated with a first set of parameters (i.e., one or more functional parameters) and a second set of parameters (i.e., one or more non-functional parameters). In an embodiment, the one or more first services may be selected from the one or more available services based on the request.

"One or more second services" refer to one or more intangible commodities that may not be required by an individual to process a task. Of the one of more available services, the one of more second services are the ones that are not the one or more first services.

A "request" refers to a message, an instruction, or a query that is indicative of at least a requirement of one or more services to process one or more tasks. In an embodiment, a requestor may utilize a requestor computing device to transmit the request to a server or a shared service platform over a communication network. In an embodiment, the request may further comprise one or more functional parameters (e.g., one or more keywords) and one or more non-functional parameters (e.g., a preference score of each of the one or more keywords, SLAs, and/or the like) of the one or more required services. For example, a request may be represented as "a string tokenizer for word document with a run time of 10 sec," "a pdf to word converter with a run time of 3 sec," and/or the like. In response to the request, the requestor may receive a ranked list of the one or more required services from the server or the shared service platform over the communication network.

A "first set of parameters" of a first service of the one or more first services refers to one or more functional parameters associated with the first service. The first set of parameters may correspond to at least one or more keywords specified by a requestor, that are indicative of at least one or more of an input, output, pre-conditions, and effect/post-conditions (IOPE) of the first service. For example, a requestor requests for an "excel to pdf converter." In such a case, the first set of parameters may correspond to "excel," "pdf," and "converter."

A "second set of parameters" of a first service of the one or more first services refers to one or more non-functional parameters associated with the first service. The second set of parameters may correspond to at least one or more of a SLA, a required efficiency, a required quality, a required run-time, and a preference of the requestor for each of one or more functional parameters of the first service. For example, a requestor requests for a "pdf to word converter" with an accuracy of "95%" and a run-time of "3 seconds." In such a case, the second set of parameters may correspond to "95%" and "3 seconds."

A "first set of new parameter values" refers to one or more numerical values corresponding to each of one or more keywords in a request. In an embodiment, the first set of new parameter values of a keyword that corresponds to the one or more keywords may be determined based on a comparison of one or more keywords in the request with the first set of parameters associated with one or more first services. In an embodiment, the first set of new parameter values may be either "0" or "1."

A "second set of new parameter values" refers to one or more numerical values corresponding to each of one or more SLAs in a request. In an embodiment, the second set of new parameter values of a SLA that corresponds to the one or more SLAs may be determined based on a comparison of the one or more SLAs in the request with the second set of parameters associated with one or more first services. In an embodiment, the second set of new parameter values may be either "0" or "1."

A "first set of weight values" correspond to one or more keywords refers to a numerical value that is indicative of a set of preferences of a requestor for the one or more keywords. In an embodiment, the first set of weight values of the one or more keywords is provided by the requestor. In case the requestor has not provided the first set of weight values, the first set of weight values may be determined based on at least one or more of historical data, domain knowledge, and domain expertise associated with one or more requestors including at least the requestor. In an embodiment, the first set of weight values may be normalized in a range of [0, 1].

A "second set of weight values" correspond to one or more SLAs refers to a numerical value that is indicative of a set of preferences of a requestor for the one or more SLAs. In an embodiment, the second set of weight values of the one or more SLAs is provided by the requestor. In case the requestor has not provided the second set of weight values, the second set of weight values may be determined based on at least one or more of historical data, domain knowledge, and domain expertise associated with one or more requestors including at least the requestor. In an embodiment, the second set of weight values may be normalized in a range of [0, 1].

A "first score" of a first service refers to a numerical value that may be indicative of an average match across one or more functional parameters of the first service in a repository. The first score may be determined based on a first set of new parameter values and a first set of weight values corresponding to one or more keywords in the received request. In an embodiment, the first score may be utilized to rank one or more first services.

A "second score" of a first service refers to a numerical value that may be indicative of an average match across one or more non-functional parameters of the first service in a repository. The second score may be determined based on a second set of new parameter values and a second set of weight values corresponding to one or more SLAs in the received request. In an embodiment, the second score may be utilized to rank the one or more first services.

A "third score" of a first service refers to a numerical value that may be determined based on at least a first score and a second score. In an embodiment, the third score may correspond to a weighted sum of the first score and the second score. Further, in an embodiment, the third score of each of one or more first services may be utilized to rank the one or more first services.

FIG. 1 is a block diagram that illustrates a system environment in which various embodiments of a method and a system for recommending one or more first services to a requestor may be implemented. With reference to FIG. 1, there is shown a system environment 100 that includes a service provider computing device 102, a requestor computing device 104, a database server 106, an application server 108, and a communication network 110. Various devices in the system environment 100 may be interconnected over the communication network 110. FIG. 1 shows, for simplicity, one service provider computing device 102, one requestor computing device 104, one database server 106, and one application server 108. However, it will be apparent to a person having ordinary skills in the art that the disclosed embodiments may also be implemented using multiple service provider computing devices, multiple requestor computing devices, multiple database servers, and multiple application servers without departing from the scope of the disclosure.

The service provider computing device 102 refers to a computing device that may be utilized by a service provider. The service provider may correspond to an individual, a sales person, or an artificial entity, such as an organization or a franchise, who may be interested in selling, renting, or sharing one or more available services to a customer (i.e., a requestor).

The service provider computing device 102 may comprise one or more processors in communication with one or more memories. The service provider computing device 102 may be operable to execute one or more sets of computer readable codes, instructions, programs, or algorithms stored in the one or more memories. In an embodiment, the service provider computing device 102 may be communicatively coupled to the communication network 110. In an embodiment, the service provider computing device 102 may further comprise a display screen that may be configured to display one or more user interfaces to the service provider.

In an embodiment, the one or more service providers may utilize corresponding one or more service provider computing devices, such as the service provider computing device 102, to share the one or more available services with the application server 108. The application server 108 may correspond to a shared service platform server. In an embodiment, the one or more service providers may further transmit service metadata associated with each of the one or more available services to the application server 108. The service metadata may include at least one or more functional parameters and one or more non-functional parameters of the one or more available services. For example, the one or more functional parameters of an available service may include one or more of, but not limited, a type, a function, and an intent of the available service. The one or more functional parameters of the available service may be represented by one or more keywords. Further, the one or more non-functional parameters of the available service may include one or more of, but not limited, an accuracy, an efficiency, a run-time, and SLAs of the available service. The SLAs may include at least a cost (e.g., a first cost for renting, a second cost for selling, a third cost for sharing, and/or the like) and a timeline of the available service. Further, in an embodiment, the one or more service providers may utilize the service provider computing device 102 to input a minimum threshold cost and a maximum threshold cost for each of the one or more available services. The minimum threshold cost may correspond to a minimum cost that may be charged by the one or more service providers for sharing, renting, or selling the one or more available services with the application server 108 or the requestor. The maximum threshold cost may correspond to a maximum cost that may be charged by the one or more service providers for sharing, renting, or selling the one or more available services with the application server 108 or the requestor. In an embodiment, the one or more service providers may utilize the service provider computing device 102 to change the cost, based on at least a demand for the one or more available services and/or a time in a day for such a demand.

The service provider computing device 102 may correspond to various types of computing devices, such as, but not limited to, a desktop computer, a laptop, a PDA, a mobile device, a smartphone, a tablet computer (e.g., iPad® and Samsung Galaxy Tab®), a data center, and/or the like.

The requestor computing device 104 refers to a computing device that may be utilized by the requestor. The requestor may correspond to an individual, or an artificial entity, such as an organization, which may be interested in buying, renting, or sharing one or more first services from the application server 108 or the one or more service providers. The requestor may require the one or more first services to process the one or more tasks. For example, a requestor has a "word document" that is required to be converted into a "pdf document." However, the requestor does not possess any converter that can perform the required operation. In such a case, the requestor may initiate a request for a service that may facilitate the conversion of the "word document" into the "pdf document."

In an embodiment, the requestor computing device 104 may comprise one or more processors in communication with one or more memories. The requestor computing device 104 may be operable to execute one or more sets of computer readable codes, instructions, programs, or algorithms stored in the one or more memories. In an embodiment, the requestor computing device 104 may be communicatively coupled to the communication network 110. In an embodiment, the requestor computing device 104 may comprise a display screen that may be configured to display one or more user interfaces to the requestor.

In an embodiment, the requestor may utilize the requestor computing device 104 to transmit one or more requests to the application server 108 or the service provider computing device 102 over the communication network 110. The one or more requests may be indicative of at least a requirement of the one or more services to process the one or more tasks. The requestor may further transmit one or more keywords and one or more SLAs associated with the request, to the application server 108. The one or more keywords may correspond to the one or more functional parameters of the request. The SLAs may correspond to the one or more non-functional parameters of the request.

The requestor computing device 104 may correspond to various types of computing devices, such as, but not limited to, a desktop computer, a laptop, a PDA, a mobile device, a smartphone, a tablet computer (e.g., iPad® and Samsung Galaxy Tab®), and/or the like.

The database server 106 may refer to a computing device that may be configured to store the one or more available services, received from one or more service provider computing devices, such as the service provider computing device 102, over the communication network 110. The database server 106 may further be configured to store the service metadata (i.e., the one or more functional parameters and the one or more non-functional parameters) of the one or more available services received from the service provider computing device 102. In an embodiment, the one or more available services may be stored as an ontology in the database server 106. For example, each of the one or more available services is represented as a node in an ontology. A node that correspond to an available service includes information, such as, a service ID, a service name, one or more functional attributes, and one or more non-functional attributes of the available service, and/or the like. In an embodiment, the one or more functional attributes may correspond to input, output, pre-condition, effect/post-condition (IOPE). Each of the available service in the database server 106 may comprise one or more combinations of the IOPE. The one or more combinations of the IOPE associated with each of the available service may be stored as an "IOPE BitSet" in the database server 106.

In an embodiment, the ontology may be implemented as a closure table in a relational database. The relational database may be maintained with the help of of various techniques known in the art, such as a relation database management system (RDBMS) technique. For example, Table 1 depicts an illustrative tabular data structure stored in the database server 106 that includes five available services (i.e., "S-1", "S-2", "S-3", "S-4", and "S-5") and the corresponding service metadata.

TABLE 1

Illustration of the one or more available service stored in the repository

| Service | Service ID | Service Name | Functional Attributes (IOPE) | Non-functional Attributes (SLA) | |
|---|---|---|---|---|---|
| | | | | Runtime | Accuracy |
| S-1 | 101 | Tokenizer | Tokenize word doc. | 10 sec | 1.00 |
| S-2 | 102 | Converter | Pdf to word | 10 sec | 0.97 |
| S-3 | 103 | Converter | Word to pdf | 22 sec | 0.90 |
| S-4 | 104 | Tokenizer | Tokenize pdf doc. | 15 sec | 0.95 |
| S-5 | 105 | Converter | pdf to word/ppt | 5 sec | 1.00 |

In another embodiment, the ontology may be implemented as a set of normalized tables in a relational database.

Further, in an embodiment, the database server 106 may be configured to store the one or more requests received from the requestor. The one or more requests may be required to process the one or more tasks. Further, the one or more requests may include the one or more keywords and the one or more SLAs. Further, the database server 106 may be configured to store a first weight value and a second weight value pertaining to each of the one or more keywords and the one or more SLAs, respectively. In an embodiment, the requestor may provide the first weight value and the second weight value along with the one or more requests.

For querying the database server 106, one or more querying languages may be utilized, such as, but not limited to, SQL, QUEL, DMX and so forth. Further, the database server 106 may be realized through various technologies, such as, but are not limited to, Microsoft® SQL server, Oracle®, and MySQL®. In an embodiment, the application server 108 may connect to the database server 106 using one or more protocols, such as, but not limited to, ODBC protocol and JDBC protocol.

The application server 108 refers to a computing device that may comprise one or more processors in communication with one or more memories. The one or more memories may include one or more computer readable codes, instructions, programs, or algorithms that are executable by the one or more processors to perform one or more operations. For example, the application server 108 may receive the one or more requests from the requestor computing device 104 over the communication network 110. Further, the application server 108 may be configured to select the one or more first services from the one or more available services, based on at least the one or more requests. Prior to the selection of the one or more first services from the one or more available services, the application server 108 may be configured to transmit a query to the database server 106 to determine a matching of the one or more keywords (determined from the one or more requests) and the one or more SLAs in the request with the first set of parameters and the second set of parameters, respectively, associated with the one or more available services. Based on the determined matching, the application server 108 may select the one or more first services from the one or more available services. Thereafter, the application server 108 may be configured to determine a first score and a second score for each of the selected one or more first services. The determination of the first score and the second score has been explained in detail in conjunction with FIGS. 3A and 3B.

In an embodiment, the application server 108 may further be configured to rank the selected one or more first services, based on a weighted sum of the first score and the second score. The application server 108 may further be configured to transmit a recommendation of the one or more first services to the requestor based on the ranking. The ranking of the one or more first services has been explained in detail in conjunction with FIGS. 3A and 3B.

Examples of the application server 108 may include, but are not limited to, a relational database server, a SAP® server, a PeopleSoft® server, a Siebel® server, and the like. For querying the application server 108, one or more querying languages, such as, but are not limited to, SQL, QUEL, DMX and so forth, may be utilized. In an embodiment, the requestor computing device 104 may connect to the application server 108 using one or more protocols such as, but not limited to, ODBC protocol and JDBC protocol.

The communication network 110 may include a medium through which devices, such as the service provider computing device 102, the requestor computing device 104, the database server 106, and the application server 108, may communicate with each other. Examples of the communication network 110 may include, but are not limited to, the Internet, a cloud network, a Wireless Fidelity (Wi-Fi) network, a Wireless Local Area Network (WLAN), a LAN, a plain old telephone service (POTS), and/or a Metropolitan Area Network (MAN). Various devices in the system environment 100 may be configured to connect to the communication network 110, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, such as Long Term Evolution (LTE), and/or Bluetooth (BT) communication protocols.

Figure 2:
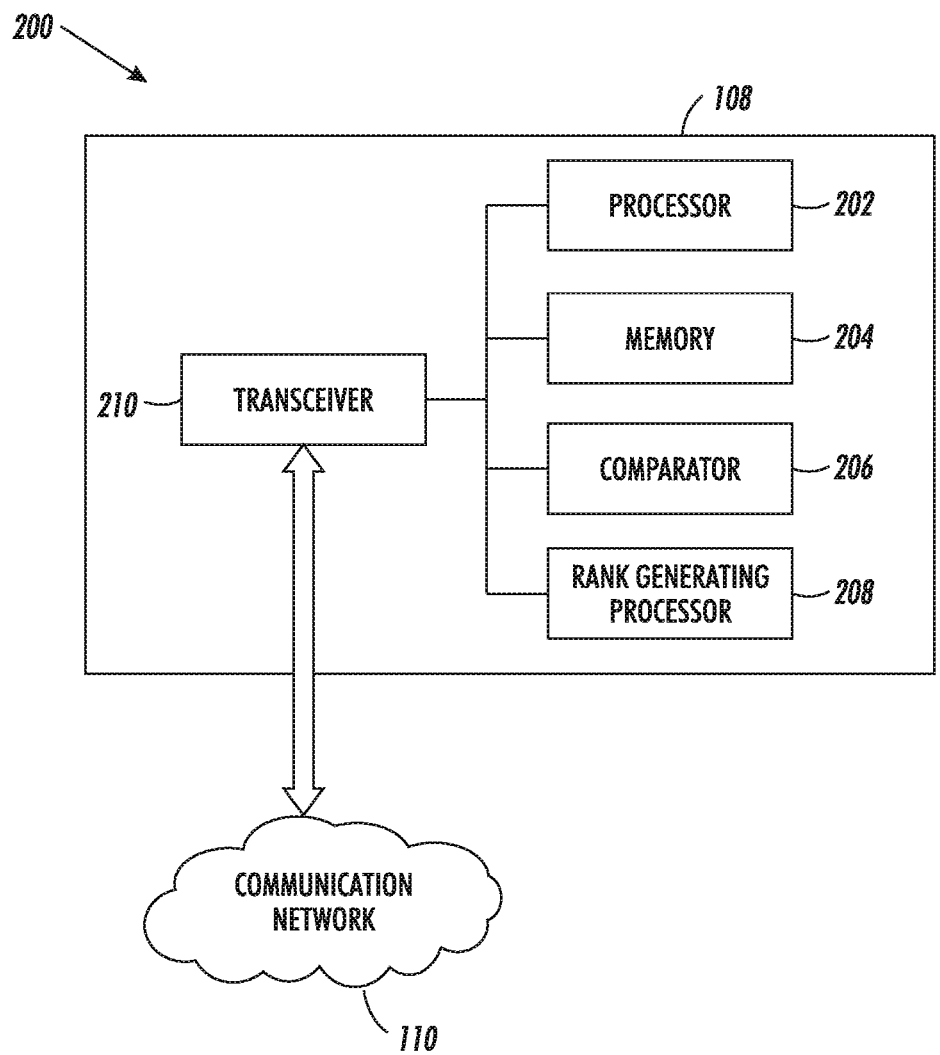
FIG. 2 is a block diagram that illustrates various components of an application server, in accordance with at least one embodiment.

FIG. 2 is a block diagram that illustrates various components of an application server 108, in accordance with at least one embodiment. FIG. 2 is explained in conjunction with FIG. 1. The application server 108 may include one or more processors, such as a processor 202, one or more memories, such as a memory 204, one or more comparators, such as a comparator 206, one or more rank generating processors, such as a rank generating processor 208, and one or more transceivers, such as a transceiver 210. A person with ordinary skill in the art will appreciate that the scope of the disclosure is not limited to the components as described herein, and other specialized circuitries can also be utilized to perform the functionalities, without deviating from the scope of the disclosure.

The processor 202 may comprise suitable logic, circuitry, interface, and/or code that may be configured to execute one or more sets of instructions stored in the memory 204. The processor 202 may be communicatively coupled to the memory 204, the comparator 206, the rank generating processor 208, and the transceiver 210. The processor 202 may execute the one or more sets of instructions, programs, codes, and/or scripts stored in the memory 204 to perform the one or more operations. For example, the processor 202 may operate in conjunction with the memory 204, the comparator 206, the rank generating processor 208, and the transceiver 210, to transmit the recommendation of the one or more first services to the requestor. The processor 202 may be implemented based on a number of processor technologies known in the art. Examples of the processor 202 include, but are not limited to, an X86-based processor, a Reduced Instruction Set Computing (RISC) processor, an Application-Specific Integrated Circuit (ASIC) processor, a Complex Instruction Set Computing (CISC) processor, a microprocessor, a microcontroller, and/or the like.

The memory 204 may comprise suitable logic, circuitry, and/or interfaces that may be configured to store one or more machine codes, and/or computer programs having at least one code section executable by the processor 202 and/or the rank generating processor 208. In an embodiment, the memory 204 may be configured to store the service metadata of the one or more available services that may be retrieved from the database server 106. Further, the memory 204 may be configured to store the one or more requests received from the requestor computing device 104. Some of the commonly known memory implementations include, but are not limited to, a random access memory (RAM), a read only memory (ROM), a hard disk drive (HDD), and a secure digital (SD) card. It will be apparent to a person having ordinary skills in the art that the one or more sets of instructions, programs, codes, and/or scripts stored in the memory 204 may enable the hardware of the application server 108 to perform the one or more predetermined operations.

The comparator 206 may comprise suitable logic, circuitry, and/or interfaces that may be configured to compare at least two input signals to generate an output signal. In an embodiment, the output signal may correspond to either "1" or "0." In an embodiment, the comparator 206 may generate output "1" if the value of a first signal (from the at least two signals) is greater than a value of the second signal (from the at least two signals). Similarly, the comparator 206 may generate an output "0" if the value of the first signal is less than the value of the second signal. For example, the comparator 206 may compare the one or more keywords (determined from the one or more requests) and the one or more SLAs with the first set of parameters and the second set of parameters, respectively, associated with the one or more available services. Based on the comparison, the processor 202 may determine the matching (e.g., an exact matching, a subsumed matching, or a null intersection matching). Based on the matching, the processor 202 may be configured to select the one or more services from the one or more available services. The selected one or more services may correspond to the one or more first services. Further, in an embodiment, based on the comparison, the processor 202 may determine a first set of new parameter values corresponding to the one or more keywords in the received request and a second set of new parameter values corresponding to the one or more SLAs in the received request. In an embodiment, the comparator 206 may be realized through either software technologies or hardware technologies known in the art.

Though, the comparator 206 is depicted as independent from the processor 202 in FIG. 2, a person skilled in the art will appreciate that the comparator 206 may be implemented within the processor 202, without departing from the scope of the disclosure. Further, a person skilled in the art will appreciate that the processor 202 may be configured to perform the functionalities of the comparator 206, without departing from the scope of the disclosure.

The rank generating processor 208 may comprise suitable logic, circuitry, interface, and/or code that may be configured to execute one or more sets of instructions stored in the memory 204. The rank generating processor 208 may be communicatively coupled to the processor 202, the memory 204, the comparator 206, and the transceiver 210. The rank generating processor 208 may execute the one or more sets of instructions, programs, codes, and/or scripts stored in the memory 204 to perform the one or more operations. For example, the rank generating processor 208 may be configured to rank the one or more first services based on a third score associated with each of the one or more first services. The third score is the weighted sum of the first score and the second score. The rank generating processor 208 may be implemented based on a number of processor technologies known in the art. Examples of the rank generating processor 208 include, but are not limited to, an X86-based processor, a RISC processor, an ASIC processor, a CISC processor, a microprocessor, a microcontroller, and/or the like.

Though, the rank generating processor 208 is depicted as independent from the processor 202 in FIG. 2, a person skilled in the art will appreciate that the rank generating processor 208 may be implemented within the processor 202 without departing from the scope of the disclosure. Further, a person skilled in the art will appreciate that the processor 202 may be configured to perform the functionalities of the rank generating processor 208 without departing from the scope of the disclosure.

The transceiver 210 may comprise suitable logic, circuitry, interface, and/or code that may be configured to communicate with the one or more devices, such as the service provider computing device 102, the requestor computing device 104, and/or one or more servers, such as the database server 106, over the communication network 110. The transceiver 210 may be configured to transmit or receive the one or more sets of instructions, queries, and/or other information to/from various components of the system environment 100. The transceiver 210 may implement one or more known technologies to support wired or wireless communication with the communication network 110. In an embodiment, the transceiver 210 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 210 may communicate via wireless communication with networks, such as the Internet, an Intranet and/or a wireless network, such as a cellular telephone network, a LAN and/or a MAN. The wireless communication may use any of a plurality of communication standards, protocols and technologies, such as a Global System for Mobile Communications (GSM), an Enhanced Data GSM Environment (EDGE), a wideband code division multiple access (W-CDMA), a code division multiple access (CDMA), a time division multiple access (TDMA), a Bluetooth, a Wireless Fidelity (Wi-Fi) (e.g., IEEE 802.11a, IEEE 802.11b, IEEE 802.11g and/or IEEE 802.11n), a voice over Internet Protocol (VoIP), a Wi-MAX, a protocol for email, an instant messaging, and/or a Short Message Service (SMS).

Figure 3A:
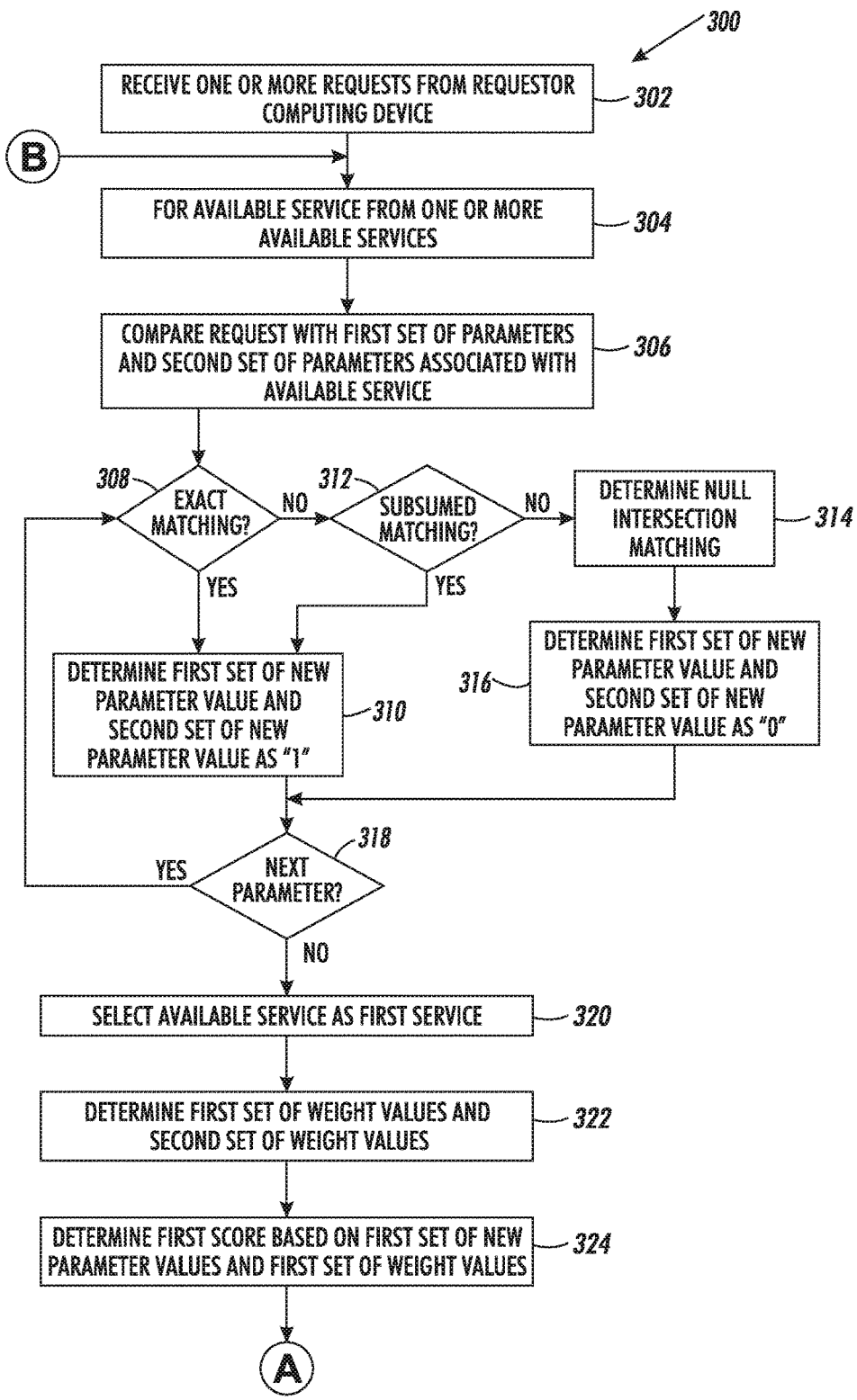
FIGS. 3A and 3B collectively depict a flowchart that illustrates a method for recommending services to a requestor, in accordance with at least one embodiment.
Figure 3B:
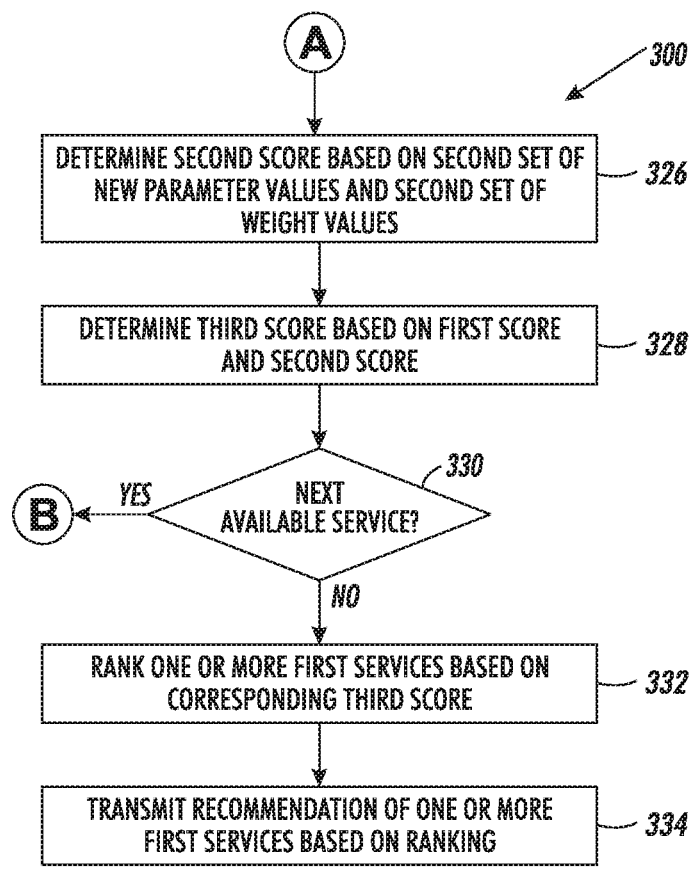

FIGS. 3A and 3B collectively depict a flowchart 300 that illustrates a method for recommending services to a requestor, in accordance with at least one embodiment. With reference to FIGS. 3A and 3B, there is shown the flowchart 300 that is described in conjunction with FIG. 1 and FIG. 2. The method starts at step 302.

At step 302, the one or more requests are received from the requestor computing device 104. The one or more requests may be indicative of at least a requirement of the requestor for the one or more services to process the one or more tasks. In an embodiment, the transceiver 210 may be configured to receive the one or more requests from the requestor computing device 104 over the communication network 110. The one or more requests may further comprise the one or more keywords and the one or more SLAs provided by the requestor at the requestor computing device 104. The processor 202 may determine the one or more keywords and the one or more SLAs from the one or more requests. The one or more keywords may correspond to the one or more functional parameters and the one or more SLAs may correspond to the one or more non-functional parameters of a service requested by the requestor. For example, the requestor may provide a request "pdf to word convertor" for a service, such as "pdf to word conversion service." The processor 202 may determine one or more keywords (e.g., "pdf", "word", and "converter") that define the "pdf to word conversion service." The requestor may further provide SLAs, such as a desired efficiency and a desired run-time for the "pdf to word conversion service." In an embodiment, the one or more requests may further include the first weight value and the second weight value associated with each of the one or more keywords and SLAs, respectively.

In an embodiment, each of the one or more available services in the repository may be associated with metadata that includes at least the first set of parameters and the second set of parameters. In an embodiment, each of the one or more available services is represented as a node in an ontology of service definitions supported by a service platform on the application server 108. Each instance of a service running on the service platform adheres to one of the services defined in the ontology. Each service definition in the ontology may comprise attributes, which can be categorized based on IOPE. Further, one or more SLAs may be stored as QoS parameters. Each service may have values assigned to the QoS parameters relevant for the service.

Each node in the ontology comprises information that corresponds to name of an available service, IOPE, QoS parameter types, and values associated with the QoS parameter types for all the nodes in the ontology. For storing the IOPE information, a table containing the list of all the attributes may be created.

Further, the first set of parameters of an available service (e.g., a document converter) defines the available service and may correspond to the one or more keywords (e.g., "pdf," "word," and "converter") in the received request. The second set of parameters of the available service may correspond to the one or more SLAs (e.g., desired efficiency and/or desired run-time) in the received request. In an embodiment, the one or more requests may further include the first weight value and the second weight value associated with each of the one or more keywords (in turn, the first set of parameters) and the one or more SLAs (in turn, the second set of parameters), respectively. The first weight values and the second weight values may correspond to the one or more preferences of the requestor for each of the one or more keywords and the one or more SLAs, respectively.

In an illustrative scenario, a request may be received in the form of a tuple, from the requestor computing device 104, as depicted below, $$R=[\{(p_1,p_2,\ldots p_n),(w_1,w_2,\ldots w_n)\},\{(q_1,q_2,\ldots q_n),(x_1,x_2,\ldots x_n)\}] \quad (1)$$

where,

R: corresponds to a request from a requestor;

$p_1, p_2, \ldots p_n$: correspond to one or more keywords such as "n" number of keywords;

$w_1, w_2, \ldots w_n$: correspond to first weight values associated with each of the "n" number of keywords;

$q_1, q_2, \ldots q_n$: correspond to one or more SLAs, such as "n" number of SLAs; and $x_1, x_2, \ldots x_n$: correspond to second weight values associated with each of the "n" number of SLAs.

A person skilled in the art will understand that the scope of the disclosure should not be limited to the representation of the request, as shown in equation-1. Further, the examples provided above are for illustrative purposes and should not be construed to limit the scope of the disclosure. In an embodiment, the received request may be in the form of an array, a table, or a linked list, and/or the like.

After receiving the one or more requests, the transceiver 210 may be configured to store the one or more requests along with the associated information (i.e., the one or more keywords, the one or more SLAs, the first weight values, and the second weight values) in the memory 204 or the database server 106.

In an embodiment, each available service may exhibit a combination of multiple inputs, outputs, pre-conditions and effect attributes as part of the service definition. In an exemplary implementation, Java data type, "BitSet," may be used to save the combination. In such a case, the processor 202 may generate a BitSet for the one or more keywords in the received one or more requests.

At step 304, for an available service from the one or more available services, the step 306 is performed. At step 306, the request is compared with the first set of parameters and the second set of parameters associated with the available service. In an embodiment, the comparator 206 in conjunction with the processor 202 may be configured to compare the request with the first set of parameters and the second set of parameters associated with the available service. The comparator 206 may be configured to compare the one or more keywords and the one or more SLAs with the first set of parameters and the second set of parameters, respectively, associated with the available service.

In an embodiment, the processor 202 may utilize the comparison of each of the one or more keywords and the one or more SLAs in the request with the corresponding first set of parameters and the second set of parameters, respectively, to determine a match that corresponds to one of an exact match, a subsumed match, and a null intersection match. Based on the comparison, the processor 202 may be configured to determine at least one first service or a combination of the one or more first services from the one or more available services that may be a closest match to the requirements of the requestor. In an embodiment, the processor 202 performs a Depth-First-Search (DFS) across the ontology of available services. On every visit, the processor 202, in conjunction with the comparator 206, performs a logical "AND" of the one or more keywords in the received request with the IOPE BitSet. If the value is not 0, it is either an exact match or a subsumed match. Thus, a first service from the one or more available services may be determined that matches with the one or more keywords in the one or more requests.

At step 308, a check is performed to determine whether the exact matching has occurred. In an embodiment, the processor 202 may be configured to perform the check to determine whether the exact matching has occurred. In an embodiment, the exact matching may occur when the requested one or more keywords and the one or more SLAs in the one or more requests exactly match the first set of parameters and the second set of parameters, respectively, associated with the available service. This may imply that each of the one or more keywords exactly matches the first set of parameters of the available service. Similarly, each of the one or more SLAs exactly matches the second set of parameters of the available service. In an illustrative scenario, the exact matching of the request may be depicted as shown below, $$p_{a1} = p_{r1} \quad (2a)$$

$$p_{qa1} = p_{qr1} \quad (2b)$$

where, $p_{a1}$: corresponds to a first set of parameters of an available service;

$p_{qa1}$: corresponds to a second set of parameters of the available service;

$p_{r1}$: corresponds to a keyword in a request; and $p_{qr1}$: corresponds to an SLA in the request.

In an embodiment, if the exact matching occurs, the control passes to step 310. Else the control passes to step 312. At step 310, the first set of new parameter values and the second set of new parameter values are determined to be as "1." In an embodiment, the processor 202 may be configured to determine each of the first set of new parameter values and each of the second set of new parameter values to be as "1," when the exact matching has occurred.

For example, consider a request for a document converter. The request is to convert a pdf document into a word document. The one or more keywords of the request includes three keywords, i.e., "pdf," "word," and "converter." The one or more SLAs of the request includes a desired accuracy of "0.90" and a runtime of "20 seconds." It may be observed from Table 1 that the request exactly matches the available service, i.e., "S-2." The one or more keywords (i.e., "pdf," "word," and "converter") and the one or more SLAs (i.e., "0.90" accuracy and "20 seconds" runtime) of the request exactly match the first set of parameters and the second set of parameters of the available service, i.e., "S-2," respectively, as shown in Table 1. The control passes to step 318.

At step 308, when the exact matching fails to occur, the control passes to step 312. At step 312, a check is performed to determine whether the subsumed matching has occurred. In an embodiment, the processor 202 may be configured to perform the check to determine whether the subsumed matching has occurred. In an embodiment, the subsumed matching may occur when there is more than an exact match between the requested one or more keywords and the one or more SLAs in the one or more requests and the first set of parameters and the second set of parameters, respectively, associated with the available service. In other words, apart from the exact matching, the available service may further include one or more additional features or functionalities that are over and above the expectations of the requestor. In an illustrative scenario, the subsumed matching of the request may be depicted as shown below:

$$p_{a1} \sqsupseteq p_{r1} \quad (3a)$$

$$p_{qa1} \sqsupseteq p_{qr1} \quad (3b)$$

In an embodiment, if the subsumed matching occurs, the control passes to step 310. Else the control passes to step 314.

For example, consider a request for a document converter. The request is to convert a pdf document to a word document. The one or more keywords of the request include three keywords, i.e., "pdf," "word," and "converter." The one or more SLAs of the request includes a desired accuracy of "1.00" and a runtime of "5 seconds." It may be observed from the Table 1 that there is more than an exact matching between the one or more keywords (i.e., "pdf," "word," and "converter") and the one or more SLAs (i.e., "1.00" accuracy and "5 seconds" runtime) of the request, and the first set of parameters and the second set of parameters of the fifth service, i.e., "S-5," respectively, as shown in the Table 1. In other words, the fifth service, i.e., "S-5," facilitates an additional service that may convert the pdf document into a power point (ppt) document. In such a case, the fifth service, i.e., "S-5," is a subsumed match for the request.

In an embodiment, if the subsumed matching fails to occur, the control passes to step 314. At step 314, a null intersection matching is determined. In an embodiment, the processor 202 may be configured to determine the null intersection matching. In an embodiment, the null intersection matching may be determined when the requested one or more keywords and the one or more SLAs of the one or more requests do not match the first set of parameters and the second set of parameters, respectively, associated with the available service. In an illustrative scenario, the null intersection matching of the request may be depicted as shown below, $$p_{a1} \cap p_{r1} = \emptyset \quad (4a)$$

$$p_{qa1} \cap p_{qr1} = \emptyset \quad (4b)$$

For example, consider a request for a document converter. The request is to convert an excel document to a pdf document. The one or more keywords of the request includes three keywords, i.e., "excel," "pdf," and "converter." The one or more SLAs of the request include a desired accuracy of "1.00" and a runtime of "12 seconds." It may be observed from the Table 1 that the request does not match with any of the five services mentioned in the Table 1.

At step 316, the first set of new parameter values and the second set of new parameter values are determined to be "0." In an embodiment, the processor 202 may be configured to determine the first set of new parameter values and the second set of new parameter values to be "0," when the null intersection matching has occurred. The control passes to step 318.

At step 318, next parameter may be checked in the available service. In an embodiment, the processor 202 may be configured to perform the check for the next parameter(s) in the available service. In such a case, when the check performed by the processor 202 results "yes," control passes back to step 308. Else, the control passes to step 320.

At step 320, the available service is selected as the first service. In an embodiment, the processor 202 may be configured to select the available service as the first service from the one or more available services.

Subsequently, at step 322, a first set of weight values and a second set of weight values are determined. In an embodiment, the first set of weight values and the second set of weight values may be associated with the one or more keywords and the one or more SLAs in the request, respectively. In an embodiment, the first set of weight values and the second set of weight values correspond to preferences of the requestor for each of the one or more keywords and each of the one or more SLAs, respectively. In an embodiment, the processor 202 may be configured to determine the first set of weight values and the second set of weight values. The first set of weight values and the second set of weight values may be determined by the processor 202, when not provided by the requestor. In an embodiment, the processor 202 may determine the first set of weight values and the second set of weight values based on at least the one or more of historical data, domain knowledge, and domain expertise associated with the one or more requestors, including at least the requestor.

For example, the processor 202 may determine the first set of weight values associated with the one or more keywords in the request, based on one or more of, but not limited to, an occurrence of the one or more keywords in one or more previous requests, a historical demand of the one or more keywords, and a current demand of the one or more keywords. For example, the one or more keywords of the request include "pdf," "word," and "converter." The historical demand of the one or more keywords is "100." The occurrence of the first keyword "pdf" in the one or more previous requests is "200." In such a case, the processor 202 may determine the first weight value of the first keyword "pdf" as "100/200=0.5." Similarly, the processor 202 may determine the second weight values associated with the one or more SLAs in the request.

In an embodiment, the requestor may provide the first set of weight values and the second set of weight values for the one or more keywords and the one or more SLAs, respectively, which may be stored in the memory 204 or the database server 106. In such a case, the processor 202 may extract the first set of weight values and the second set of weight values from the memory 204 or the database server 106.

At step 324, the first score is determined based on the first set of new parameter values and the first set of weight values. In an embodiment, the processor 202 may be configured to determine the first score based on the first set of new parameter values and the first set of weight values corresponding to the one or more keywords in the received request. In an illustrative scenario, the processor 202 may utilize the following relation (denoted by equation-5) to determine the first score:

$$S_{first} = \frac{w_1 P_1 + w_2 P_2 + w_3 P_3 + \ldots + w_n P_n}{w_1 + w_2 + w_3 + \ldots + w_n} \quad (5)$$

where, $P_1, P_2, P_3, \ldots P_n$: correspond to the first set of new parameter values, "0", or "1", as determined in step 310 or 316, based on the exact, subsumed, or null intersection matching of the one or more keywords and the first set of parameters; and $S_{first}$ corresponds to a first score.

At step 326, the second score is determined based on the second set of new parameter values and the second set of weight values. In an embodiment, the processor 202 may be configured to determine the second score based on the second set of new parameter values and the second set of weight values corresponding to the one or more SLAs in the received request. In an illustrative scenario, the processor 202 may utilize the following relation (denoted by equation-6) to determine the second score:

$$S_{second} = \frac{x_1 Q_1 + x_2 Q_2 + x_3 Q_3 + \ldots + x_n Q_n}{x_1 + x_2 + x_3 + \ldots + x_n} \quad (6)$$

where, $Q_1, Q_2, Q_3, \ldots Q_n$: correspond to second set of new parameter values, "0" or "1", as determined in step 310 or 316, based on the exact, subsumed, or null intersection matching of the one or more SLAs with the second set of parameters; and $S_{second}$: correspond to a second score.

At step 328, the third score is determined based on the first score and the second score. In an embodiment, the processor 202 may be configured to determine the third score based on the first score and the second score. In an embodiment, the processor 202 may determine the third score based on one or more mathematical operations and/or one or more logical operations on the first score and the second score. In one exemplary scenario, the third score may correspond to a combination of the first score and the second score. The combination may correspond to at least one of, but not limited to, a linear combination and a non-linear combination. In another exemplary scenario, the third score may correspond to a weighted sum of the first score and the second score. In an illustrative scenario, the processor 202 may utilize the following relation (denoted by equation-7) to determine the third score:

$$S_{third} = (\alpha * S_{first}) + (\beta * S_{second}) \quad (7)$$

where, $S_{third}$: corresponds to a third score; and $\alpha, \beta$: correspond to predefined weight values (determined based on historical data).

At step 330, a check is performed for the next available service of the one or more available services. In an embodiment, the processor 202 may be configured to perform the check for the next available service of the one or more available services. if the check performed by the processor 202 results "yes," control passes back to step 306. Else, the control passes to step 332.

For example, the processor 202 may select the one or more first services (i.e., "S-2" and "S-5") from the one or more available services and determine the corresponding third scores when no more available services are determined at step 330. Table 2 depicts an illustrative tabular data structure comprising one or more first services selected from the one or more available services.

TABLE 2

Illustration of the one or more first services

| Service | Service ID | Service Name | Functional Attributes (IOPE) | Non-Functional Attributes (SLA) | |
|---------|------------|--------------|------------------------------|---------------------------------|---|
| | | | | Runtime | Accuracy |
| S-2 | 102 | Converter | Pdf to word | 10 sec | 0.97 |
| S-5 | 105 | Converter | Pdf to word/ppt | 5 sec | 1.00 |

At step 332, the selected one or more first services are ranked based on the corresponding third scores. In an embodiment, the rank generating processor 208 may be configured to rank the one or more first services based on the corresponding third scores. For example, the one or more first services (i.e., "S-2" and "S-5") may be ranked in a sequence, as illustrated in Table 2, based on the corresponding third scores.

At step 334, the recommendation of the one or more first services is transmitted to the requestor based on the ranking. In an embodiment, the processor 202 in conjunction with the transceiver 210 may be configured to transmit the recommendation of the one or more first services to the requestor, based on the ranking. In an embodiment, the recommendation of the one or more first services may be transmitted to the requestor computing device 104 over the communication network 110. In an embodiment, the processor 202 may transmit a top "k" first services from the ranked one or more first services. In an embodiment, the value of "k" may be provided by the requestor. In another embodiment, the processor 202 may determine the value of "k," based on one or more constraints associated with the one or more first services. The one or more constraints may be based on at least one or more of, but not limited to, a time of availability of the one or more first services, a cost associated with the one or more first services, and/or the like.

After receiving the ranked one or more first services, the requestor may select one or more of the ranked one or more first services to process the one or more tasks. The requestor may select one or more of the ranked one or more first services, based on at least an acceptance of an agreement between the requestor and one or more service providers (and/or the shared service platform).

Figure 4:
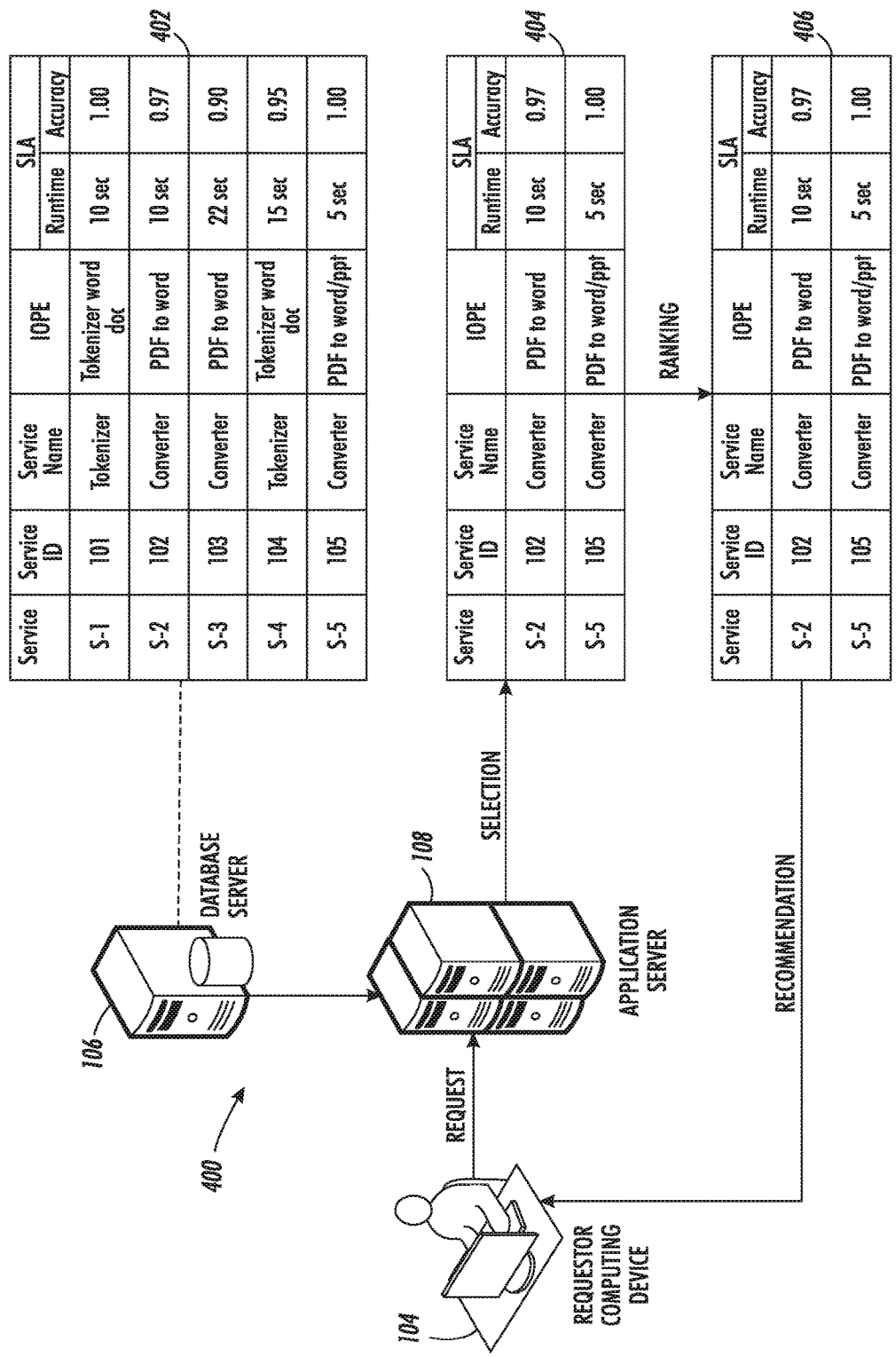
FIG. 4 is a block diagram that illustrates an exemplary scenario for recommending services to a requestor, in accordance with at least one embodiment.

FIG. 4 is a block diagram that illustrates an exemplary scenario for recommending services to a requestor, in accordance with at least one embodiment. FIG. 4 is described in conjunction with FIGS. 1-3B. With reference to FIG. 4, there is shown a block diagram 400 that comprises the requestor computing device 104, the database server 106, the application server 108, and one or more illustrative tables (denoted by 402, 404, and 406).

In an embodiment, the application server 108 may receive the request from the requestor computing device 104. The request may correspond to the requirement of the one or more first services to process the one or more tasks. For example, a request "pdf to word converter, with runtime of 10 seconds" is received by the application server 108. The request may comprise one or more keywords and one or more SLAs. In an embodiment, the request may further comprise a first weight value associated with each of the one or more keywords and a second weight value associated with each of the SLAs.

After receiving the request, the application server 108 may query the database server 106 to retrieve the one or more available services (as shown in Table 1, denoted by 402). In an embodiment, each of the one or more available services is represented as a node in an ontology of service definitions supported by a service platform. Each instance of a service running on the platform adheres to one of the services defined in the ontology. Each service definition in the ontology may comprise attributes which can be categorized based on IOPE. Further, one or more SLAs may be stored as QoS parameters. Each service may have values assigned to the QoS parameters relevant for the service.

In an embodiment, the ontology may be implemented as a closure table (in a relational database). Each node in the ontology comprises information that corresponds to the name of an available service, IOPE, QoS parameter types, and values associated with the QoS parameter types for all the nodes in the ontology. For storing the IOPE information, a table containing the list of all the attributes may be created. Each attribute may have a number as a primary key. Each service may exhibit a combination of multiple inputs, outputs, pre-conditions, and effect (IOPE) attributes as part of the service definition. In an exemplary implementation, Java data type, "BitSet," may be used to save the combination.

In response to the received request, the processor 202 may generate a "BitSet" for the one or more keywords in the received request. The processor 202 further performs a DFS across the ontology. On every visit, the processor 202 in conjunction with the comparator 206, performs a logical "AND" of the one or more keywords in the received request with the "IOPE BitSet." If the value is not 0, it is either an exact match or a subsumed match. Thus, a service may be found that matches the one or more keywords in the request.

Further, each instance of a service has one or more QoS parameters and corresponding values as part of the service definition. For example, a service "Tokenizer" may have a QoS parameter "Accuracy" with the value set as "80%." Any match (exact or subsumed) may happen if the accuracy, as provided in the request, is less than or equal to "80%." Therefore, the one or more SLAs may be captured as a rule set. In accordance with an exemplary embodiment, an engine "Drools Rule engine" in conjunction with the processor 202 may check whether the existing service instances satisfy one or more rules. The rules may be executed on a table that stores the parameter values for each service instance. The schema of such a table may include a service ID as a primary key, a service instance ID as a first foreign key, a QoS Parameter type as a second foreign key, and a value. A list of possible QoS parameter types may be stored in another table.

In an embodiment, the processor 202 may be operable to determine two lists of one or more first services: one list by performing the DFS and logical "AND" over the BitSet values and the other list by executing the rule engine. The processor 202 may further perform an intersection of the one or more first services in the two lists and determine a final list. For each of the one or more services in the final list, the processor 202 may determine weights, as described above, and perform ranking on the one or more first services that may be displayed to the user.

In an embodiment, the comparator 206 may compare the request with the one or more available services. Based on the comparison, the processor 202 may identify the type of matching of the request. As the one or more keywords and one or more SLAs in the request exactly match metadata of an available service "S-2," the type of matching of the request is the exact matching. Further, the one or more keywords and one or more SLAs in the request matches another available service "S-5," which further includes additional features that exceeds the expectations of the requestor. In such a case, the type of matching of the request may correspond to the subsumed matching. In certain scenarios, the one or more keywords and one or more SLAs in the request fail to match the metadata one or more available services, such as the service "S-4." In such a scenario, the type of matching of the request may correspond to the null intersection matching. In an embodiment, after comparing of the one or more keywords and one or more SLAs in the request with the metadata of the one or more available services, the processor 202 may select the one or more first services (i.e., "S-2" and "S-5"), as shown in table 404. For the selected one or more first services "S-2" and "S-5", the new parameter values are set to "1." For the rest of unselected services, the new parameter values are set to "0."

After the selection of the one or more first services "S-2" and "S-5," the processor 202 may determine the first score and the second score for each of the selected one or more first services "S-2" and "S-5." The determination of the first score and the second score for each of the selected one or more first services "S-2" and "S-5" may be based on the first set of weight values corresponding to the one or more keywords and the second set of weight values corresponding to the one or more SLAs. The determination of the first score and the second score for each of the selected one or more first services "S-2" and "S-5" may be further based on the first set of new parameter values or second set of new parameter values ("0" or "1") that are determined based on a type of the matching. The processor 202 may utilize one or more mathematical and logical relations (e.g., denoted by equation-5 and the equation-6) to determine the first score and the second score. Prior to the determination of the first score and the second score, the processor 202 may determine the first set of weight values corresponding to the one or more keywords and the second set of weight values corresponding to the one or more SLAs. In an embodiment, the processor 202 may determine the first set of weight values and the second set of weight values, when the requestor has not provided the first set of weight values and the second set of weight values. In such a scenario, the processor 202 may determine the first set of weight values and the second set of weight values based on at least one or more of the historical data, the domain knowledge, and the domain expertise of the one or more requestors including at least the requestor.

After determining the first score and the second score, the processor 202 may determine the third score for each of the selected one or more first services "S-2" and "S-5." The third score may be a combination of the first score and the second score, and may be determined in accordance with the equation-7.

After determining the third score for each of the one or more first services "S-2" and "S-5," the rank generating processor 208 may rank the one or more first services "S-2" and "S-5" based on the corresponding third scores. Based on the ranking, as shown in table 406, the list may be generated that includes the service "S-2" on the top and the service "S-5" next to the service "S-2." After ranking the one or more first services "S-2" and "S-5," the processor 202 in conjunction with the transceiver 210 may transmit the recommendation of the one or more first services "S-2" and "S-5" to the requestor. The recommended one or more first services "S-2" and "S-5" may be displayed on the display screen of the requestor computing device 104.

The disclosed embodiments encompass numerous advantages. Various embodiments of the disclosure lead to a method and a system for recommending services to the requestor over a communicating network. Through various embodiments of the disclosure, one or more first services are selected from the one or more available services. The one or more first services are selected based on a determination of the type of matching from the exact matching, the subsumed matching, and the null intersection matching. Further, the one or more first services are ranked based on a determined score. The score is determined based on at least the preferences of the requestor. Further, the one or more first services are recommended to the requestor, based on the ranking. Therefore, it is advantageous to recommend the one or more first services to the requestor, which match with both the one or more keywords and the one or more SLAs of the request considering the preferences of the requestor for the one or more keywords and the one or more SLAs.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for recommending services to a requestor over a communication network have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for recommending services to a requestor over a communication network, the method comprising:
    receiving, by one or more transceivers provided at a cloud-computing server, a request comprising one or more keywords and one or more service level agreements (SLAs), from a requestor computing device over the communication network, to process one or more tasks, the one or more SLAs including a desired accuracy and a desired runtime;
    selecting, by one or more processors provided at the cloud-computing server, one or more first services from services provided by one or more service providers based on the request, wherein each of the one or more first services is associated with a corresponding first set of parameters and a second set of parameters, wherein the first set of parameters correspond to the one or more keywords and the second set of parameters correspond to the one or more SLAs;
    for each of the one or more first services:
        determining, by the one or more processors, a first score based on a first set of new parameter values and a first set of weight values corresponding to the one or more keywords in the received request, the first score being determined as a sum of products between the first set of new parameter values and the first set of weight values divided by a sum of the first set of weight values;
        determining, by the one or more processors, a second score based on a second set of new parameter values and a second set of weight values corresponding to the one or more SLAs in the received request, the second score being determined as a sum of products between the second set of new parameter values and the second set of weight values divided by a sum of the second set of weight values; and
        determining, by the one or more processors, a third score as a weighted sum of the first score and the second score, wherein weights for the first score and second score are determined based on historical data;
    ranking, by the one or more processors, the one or more first services based on the third score; and
    transmitting, by the one or more transceivers, a recommendation of the one or more first services to the requestor based on the ranking.

2. The method of claim 1, further comprising receiving, by the one or more transceivers, service metadata associated with the services provided by the one or more service providers from one or more service provider computing devices over the communication network.

3. The method of claim 2, further comprising determining, by the one or more processors, the first set of new parameter values and the second set of new parameter values based on a comparison of the one or more keywords and the one or more SLAs in the request with the first set of parameters and the second set of parameters, respectively, associated with the services provided by one or more service providers.

4. The method of claim 3, wherein the comparison of each of the one or more keywords and the one or more SLAs in the request with the corresponding first set of parameters and the second set of parameters, respectively, results in one of an exact matching, a subsumed matching, and a null intersection matching.

5. The method of claim 1, further comprising determining, by the one or more processors, the first set of weight values and the second set of weight values, based on at least one or more of historical data, domain knowledge, and domain expertise associated with one or more requestors including the requestor.

6. The method of claim 1, wherein the request further comprises the first set of weight values associated with the one or more keywords and the second set of weight values associated with the one or more SLAs.

7. The method of claim 6, wherein the first set of weight values and the second set of weight values correspond to preferences of the requestor for each of the one or more keywords and each of the one or more SLAs, respectively.

8. A system for recommending services to a requestor over a communication network, the system comprising:
    one or more transceivers provided at a cloud-computing server, the one or more transceivers configured to:
        receive a request comprising one or more keywords and one or more SLAs, from a requestor computing device over the communication network, to process one or more tasks, the one or more SLAs including a desired accuracy and a desired runtime;

one or more processors provided at the cloud-computing server, the one or more processors configured to:
select one or more first services from services provided by one or more service providers based on the request, wherein each of the one or more first services is associated with a corresponding first set of parameters and a second set of parameters, wherein the first set of parameters correspond to the one or more keywords and the second set of parameters correspond to the one or more SLAs;
for each of the one or more first services:
determining a first score based on a first set of new parameter values and a first set of weight values corresponding to the one or more keywords in the received request, the first score being determined as a sum of products between the first set of new parameter values and the first set of weight values divided by a sum of the first set of weight values;
determine a second score based on a second set of new parameter values and a second set of weight values corresponding to the one or more SLAs in the received request, the second score being determined as a sum of products between the second set of new parameter values and the second set of weight values divided by a sum of the second set of weight values; and
determine a third score as a weighted sum of the first score and the second score, wherein weights for the first score and second score are determined based on historical data;
rank the one or more first services based on the third score; and
wherein the one or more transceivers are further configured to:
transmit a recommendation of the one or more first services to the requestor based on the ranking.

9. The system of claim 8, wherein the one or more transceivers are further configured to receive service metadata associated with the services provided by the one or more service providers from one or more service provider computing devices over the communication network.

10. The system of claim 9, wherein the one or more processors are further configured to determine the first set of new parameter values and the second set of new parameter values based on a comparison of the one or more keywords and the one or more SLAs in the request with the first set of parameters and the second set of parameters, respectively, associated with the services provided by one or more service providers.

11. The system of claim 10, wherein the comparison of each of the one or more keywords and the one or more SLAs in the request with the corresponding first set of parameters and the second set of parameters, respectively, results in one of an exact matching, a subsumed matching, and a null intersection matching.

12. The system of claim 11, wherein the first set of weight values and the second set of weight values correspond to preferences of the requestor for each of the one or more keywords and each of the one or more SLAs, respectively.

13. The system of claim 8, wherein the one or more processors are further configured to determine the first set of weight values and the second set of weight values, based on at least one or more of historical data, domain knowledge, and domain expertise associated with one or more requestors including the requestor.

14. The system of claim 8, wherein the request further comprises the first set of weight values associated with the one or more keywords and the second set of weight values associated with the one or more SLAs.

15. A non-transitory computer-readable storage medium having stored thereon, a set of computer-executable instructions for causing a computer comprising one or more processors to perform steps comprising:
receiving, by one or more transceivers provided at a cloud-computing server, a request comprising one or more keywords and one or more service level agreements (SLAs), from a requestor computing device over the communication network, to process one or more tasks, the one or more SLAs including a desired accuracy and a desired runtime;
selecting, by the one or more processors, one or more first services from services provided at the cloud-computing server based on the request, wherein each of the one or more first services is associated with a corresponding first set of parameters and a second set of parameters, wherein the first set of parameters correspond to the one or more keywords and the second set of parameters correspond to the one or more SLAs;
for each of the one or more first services:
determining, by the one or more processors, a first score based on a first set of new parameter values and a first set of weight values corresponding to the one or more keywords in the received request, the first score being determined as a sum of products between the first set of new parameter values and the first set of weight values divided by a sum of the first set of weight values; and
determining, by the one or more processors, a second score based on a second set of new parameter values and a second set of weight values corresponding to the one or more SLAs in the received request, the second score being determined as a sum of products between the second set of new parameter values and the second set of weight values divided by a sum of the second set of weight values; and
determining, by the one or more processors, a third score as a weighted sum of the first score and the second score, wherein weights for the first score and second score are determined based on historical data;
ranking, by the one or more processors, the one or more first services based on the corresponding third score; and
transmitting, by one or more transceivers, a recommendation of the one or more first services to a requestor based on the ranking.

16. The non-transitory computer-readable storage medium of claim 15, further comprising receiving, by the one or more transceivers, service metadata associated with the services provided by the one or more service providers from one or more service provider computing devices over the communication network.

17. The non-transitory computer-readable storage medium of claim 15, further comprising determining, by the one or more processors, the first set of new parameter values and the second set of new parameter values based on a comparison of the one or more keywords and the one or more SLAs in the request with the first set of parameters and the second set of parameters, respectively, associated with the services provided by one or more service providers.

18. The non-transitory computer-readable storage medium of claim 17, wherein the comparison of each of the one or more keywords and the one or more SLAs in the request with the corresponding first set of parameters and the second set of parameters, respectively, results in one of an exact matching, a subsumed matching, and a null intersection matching.

19. The non-transitory computer-readable storage medium of claim 15, further comprising determining, by the one or more processors, the first set of weight values and the second set of weight values, based on at least one or more of historical data, domain knowledge, and domain expertise associated with one or more requestors including the requestor.

20. The non-transitory computer-readable storage medium of claim 15, wherein the request further comprises the first set of weight values associated with the one or more keywords and the second set of weight values associated with the one or more SLAs.

\* \* \* \* \*